US010970327B2

(12) United States Patent
Vartakavi et al.

(10) Patent No.: US 10,970,327 B2
(45) Date of Patent: *Apr. 6, 2021

(54) SELECTING BALANCED CLUSTERS OF DESCRIPTIVE VECTORS

(71) Applicant: Gracenote, Inc., Emeryville, CA (US)

(72) Inventors: Aneesh Vartakavi, Emeryville, CA (US); Peter C. DiMaria, Berkeley, CA (US); Markus K. Cremer, Orinda, CA (US); Phillip Popp, Oakland, CA (US)

(73) Assignee: GRACENOTE, INC., Emeryville, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/248,627

(22) Filed: Jan. 15, 2019

(65) Prior Publication Data

US 2019/0146988 A1     May 16, 2019

Related U.S. Application Data

(63) Continuation of application No. 15/063,170, filed on Mar. 7, 2016, now Pat. No. 10,223,358.

(51) Int. Cl.
    *G06F 16/00*         (2019.01)
    *G06F 16/41*         (2019.01)

(52) U.S. Cl.
    CPC ................................. *G06F 16/41* (2019.01)

(58) Field of Classification Search
    CPC ....................................................... G06F 16/41
    See application file for complete search history.

(56) References Cited

U.S. PATENT DOCUMENTS

| 5,635,982 | A | 6/1997 | Zhang |
| 7,127,120 | B2 | 10/2006 | Hua |
| 7,251,637 | B1 | 7/2007 | Caid |
| 8,189,114 | B2 | 5/2012 | Petersohn |
| 8,855,334 | B1 | 10/2014 | Lavine et al. |
| 2004/0085341 | A1 | 5/2004 | Hua |
| 2005/0217462 | A1 | 10/2005 | Thomson |

(Continued)

OTHER PUBLICATIONS

U.S. Appl. No. 15/474,305, Final Office Action dated Aug. 8, 2018, 10 pages.

(Continued)

*Primary Examiner* — Hung Q Pham
(74) *Attorney, Agent, or Firm* — McDonnell Boehnen Hulbert & Berghoff LLP

(57) ABSTRACT

A clustering machine can cluster descriptive vectors in a balanced manner. The clustering machine calculates distances between pairs of descriptive vectors and generates clusters of vectors arranged in a hierarchy. The clustering machine determines centroid vectors of the clusters, such that each cluster is represented by its corresponding centroid vector. The clustering machine calculates a sum of intercluster vector distances between pairs of centroid vectors, as well as a sum of intra-cluster vector distances between pairs of vectors in the clusters. The clustering machine calculates multiple scores of the hierarchy by varying a scalar and calculating a separate score for each scalar. The calculation of each score is based on the two sums previously calculated for the hierarchy. The clustering machine may select or otherwise identify a balanced subset of the hierarchy by finding an extremum in the calculated scores.

20 Claims, 11 Drawing Sheets

(56) References Cited

U.S. PATENT DOCUMENTS

| | | |
|---|---|---|
| 2006/0179051 A1 | 8/2006 | Whitney |
| 2006/0204214 A1 | 9/2006 | Shah |
| 2006/0242190 A1 | 10/2006 | Wnek |
| 2007/0157795 A1 | 6/2007 | Hung |
| 2008/0170623 A1 | 7/2008 | Aharon |
| 2008/0316307 A1 | 12/2008 | Petersohn |
| 2009/0150781 A1 | 6/2009 | Iampietro |
| 2010/0040349 A1 | 2/2010 | Landy |
| 2010/0089224 A1 | 4/2010 | Fratti et al. |
| 2010/0250585 A1 | 9/2010 | Hagg et al. |
| 2012/0014673 A1 | 1/2012 | O'Dwyer |
| 2013/0205223 A1 | 8/2013 | Gilbert |
| 2013/0339349 A1 | 12/2013 | Yang |
| 2014/0037199 A1 | 2/2014 | Aharon |
| 2015/0142147 A1 | 5/2015 | Stanghed |
| 2015/0160916 A1 | 6/2015 | Lothian |
| 2015/0228310 A1 | 8/2015 | Lothian |
| 2015/0234833 A1 | 8/2015 | Cremer et al. |
| 2015/0243325 A1 | 8/2015 | Pacurariu |
| 2016/0012857 A1 | 1/2016 | Leppanen et al. |
| 2017/0026719 A1 | 1/2017 | Zhiwen |
| 2017/0249339 A1 | 8/2017 | Lester |
| 2017/0301372 A1 | 10/2017 | Jehan et al. |
| 2018/0005614 A1 | 1/2018 | Vilermo et al. |

OTHER PUBLICATIONS

U.S. Appl. No. 15/474,305, Advisory Action dated Dec. 12, 2018, 10 pages.
U.S. Appl. No. 15/474,305, Non-Final Office Action dated Mar. 4, 2019, 10 pages.
U.S. Appl. No. 15/474,305, Final Office Action dated Jan. 30, 2020, 14 pages.
U.S. Appl. No. 15/474,305, Final Office Action dated Oct. 10, 2019, 12 pages.
U.S. Appl. No. 15/474,305, Office Action dated Dec. 27, 2017, 10 pages.
Jung et al., "A Decision Criterion for the Optimal Number of Clusters in Hierarchical Clustering", Journal of Global Optimization, 25(1):91-111 (2002).
Pele et al., "The Quadratic-Chi Histogram Distance Family", Computer Vision—ECCV 2012, vol. 6312, 749-762 (2010).
International Search Report dated Jul. 20, 2018, issued in connection with International Application No. PCT/US2018/025397, filed on Mar. 30, 2018, 3 pages.
Written Opinion of the International Search Authority dated Jul. 20, 2018, issued in connection with International Application No. PCT/US2018/025397, filed Mar. 30, 2018, 6 pages.
U.S. Appl. No. 15/474,305, filed Mar. 30, 2017.
U.S. Appl. No. 15/474,305, Final Office Action dated Sep. 17, 2020, 14 pages.

EXAMPLES OF INTRA-CLUSTER VECTOR DISTANCES

EXAMPLES OF INTER-CLUSTER VECTOR DISTANCES

SELECTING BALANCED CLUSTERS OF DESCRIPTIVE VECTORS

TECHNICAL FIELD

The subject matter disclosed herein generally relates to the technical field of special-purpose machines that perform or otherwise facilitate clustering of data items, including computerized variants of such special-purpose machines and improvements to such variants, and to the technologies by which such special-purpose machines become improved compared to other special-purpose machines that perform or otherwise facilitate clustering of data items. Specifically, the present disclosure addresses systems and methods that select balanced clusters of descriptive vectors.

BACKGROUND

In data processing, a machine may be configured to analyze data items and group them into clusters, which may be referred to as clustering the data items. Typically, data items are clustered according to various commonalities in their attributes. These attributes may be specified by the data items themselves, specified in corresponding metadata, or any suitable combination thereof. In some situations, a data item (e.g., a media item, such as a video file or an audio file, or an identifier of a media item) can be described by one or more attribute-value pairs, and a group of such attribute-value pairs can be represented (e.g., in a computer memory) as a multidimensional vector. As an example, for a data item describable by 100 attribute-value pairs, a 100-dimensional descriptive vector of the data item can be generated such that each of the 100 dimensions represents a different attribute and has a corresponding scalar value. Data items represented by such descriptive vectors thus can be clustered by clustering their descriptive vectors.

BRIEF DESCRIPTION OF THE DRAWINGS

Some embodiments are illustrated by way of example and not limitation in the figures of the accompanying drawings.

DETAILED DESCRIPTION

Figure 1:
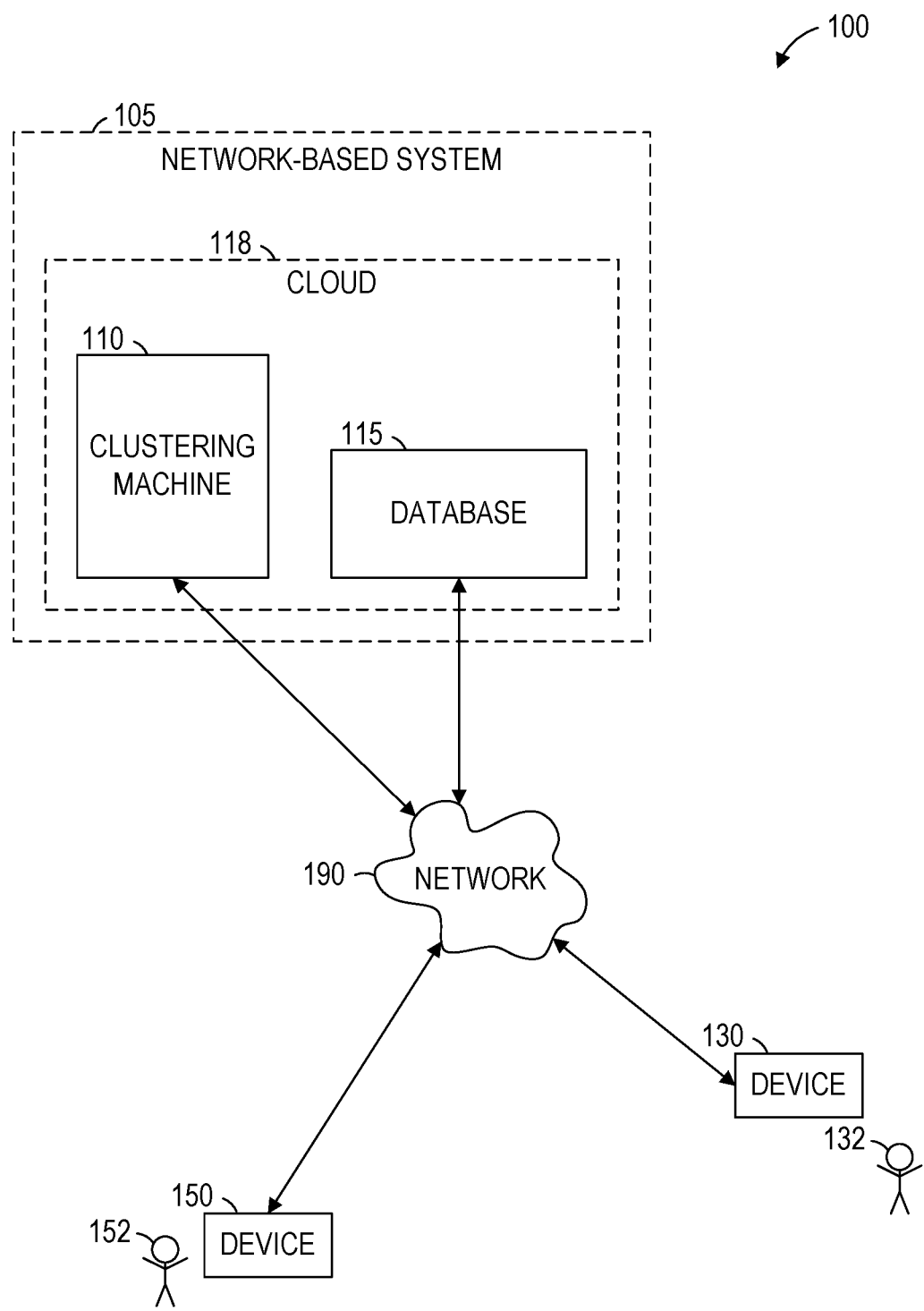
FIG. 1 is a network diagram illustrating a network environment suitable for selecting balanced clusters of descriptive vectors, according to some example embodiments.

Example methods (e.g., algorithms) facilitate selecting certain (e.g., balanced) clusters of vectors, and example systems (e.g., special-purpose machines) are configured to facilitate selecting such clusters of vectors. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A clustering machine is configured (e.g., by software modules) to access vectors (e.g., descriptive vectors that describe items, such as data items, physical items, or any suitable combination thereof) and automatically cluster them in a balanced manner, which may be referred to as automatic selecting of balanced clusters of vectors. After accessing the vectors (e.g., from a database), the clustering machine calculates distances (e.g., vector distances) between pairs (e.g., all pairs) of the accessed vectors and generates a hierarchy of clusters (e.g., vector clusters) based on the calculated distances. The hierarchy may have multiple tiers and may be referred to as a tiered hierarchy, a multi-tier hierarchy, or a multi-tiered hierarchy. The clustering machine also determines centroid vectors of the clusters (e.g., determines a separate centroid vector for each cluster), such that each cluster is represented by its corresponding centroid vector.

The clustering machine also calculates two sums, specifically, a sum (e.g., first sum) of inter-cluster vector distances between pairs of the centroid vectors for clusters (e.g., all clusters) in the hierarchy, and a sum (e.g., second sum) of intra-cluster vector distances between pairs of vectors in each of the clusters (e.g., all clusters) in the hierarchy. Having calculated these two sums, the clustering machine calculates multiple scores for the hierarchy by varying a scalar (e.g., selecting various values for the scalar) and calculating a separate score of the hierarchy for each separate scalar (e.g., each selected value of the scalar). For each selected scalar, this calculation is based on the two sums (e.g., first and second sums) previously calculated for the hierarchy. These calculated scores may be treated as representing granularity levels in the hierarchy (e.g., in the tiers of the hierarchy), and it may be helpful to select or otherwise identify a subset of the hierarchy (e.g., a particular tier) whose clusters are balanced between being excessively large and few (e.g., a couple of giant clusters) and being excessively small and numerous (e.g., too many tiny clusters).

Based on these calculated scores, the clustering machine selects a subset of the hierarchy (e.g., selects a tier from among the multiple tiers of the hierarchy). The calculated scores of the hierarchy each correspond to a different selected scalar, and the selecting of the subset may be based on a selected scalar (e.g., scalar value) that resulted in an extreme value (e.g., a minimum score or maximum score)

for the calculated score the hierarchy. In some example embodiments, this may have the effect of determining that one of the tiers represents optimal balancing, and the clustering machine may accordingly choose that tier as a selected subset of the clusters in the hierarchy of clusters. With or without tier selection, the clustering machine automatically selects a subset of the clusters, based on the selected scalar value that resulted in extreme score, such that the clusters in the selected subset are balanced in their level of granularity. This may have the effect of automatically identifying a group of clusters that are balanced between being excessively large and few and being excessively small and numerous (e.g., for providing meaningful, pragmatic, helpful, or otherwise useful groupings of the accessed vectors (e.g., descriptive vectors of items, such as data items).

The clustering machine may also be configured to interact with one or more users by suggesting, recommending, or otherwise presenting the selected subset of the clusters, for example, in response to a user input that indicates a command or request to automatically group the vectors or the items described by the vectors. In some example embodiments, the clustering machine is configured to automatically generate labels for the selected subset of the clusters and present the automatically generated labels to a user (e.g., via a device of the user). In certain example embodiments, the clustering machine is also configured as a disambiguation machine that can use the selected subset of clusters to identify a source of the items described by the vectors (e.g., as an identifier of a recording artist that released songs described by the clustered vectors).

FIG. 1 is a network diagram illustrating a network environment 100 suitable for selecting balanced clusters of descriptive vectors, according to some example embodiments. The network environment 100 includes a clustering machine 110, a database 115, and devices 130 and 150, all communicatively coupled to each other via a network 190. The clustering machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The clustering machine 110 and the devices 130 and 150 may each be implemented in a special-purpose (e.g., specialized) computer system, in whole or in part, as described below with respect to FIG. 11.

The database 115 may store descriptive vectors that describe items (e.g., data items or identifiers thereof). For example, the database 115 may store metadata (e.g., item profiles) that describe the items, and the metadata may include a descriptive vector for each item. Accordingly, each item represented in the database 115 may be represented by a separate descriptive vector (e.g., within a separate item profile for that item). According to various example embodiments, however, the descriptive vectors may be stored in the clustering machine 110 or in any of the devices 130 and 150. The network 190 enables the descriptive vectors to be accessed from one or more of the clustering machine 110, the database 115, and the devices 130 and 150.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
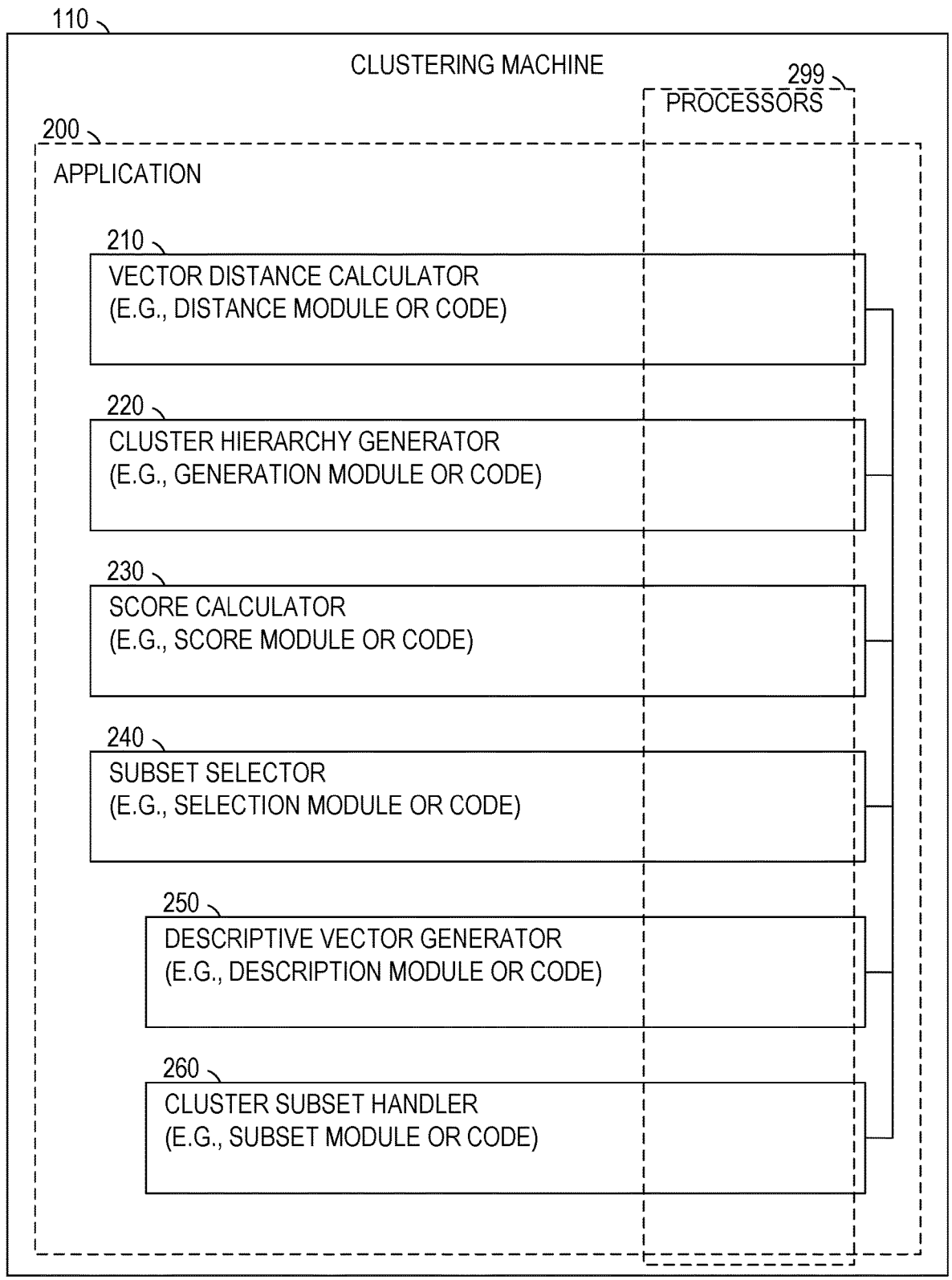
FIG. 2 is a block diagram illustrating components of a clustering machine suitable for selecting balanced clusters of descriptive vectors, according to some example embodiments.

FIG. 2 is a block diagram illustrating components of the clustering machine 110, according to some example embodiments. The clustering machine 110 is shown as including a vector distance calculator 210, a cluster hierarchy generator 220, a score calculator 230, a subset selector 240, a descriptive vector generator 250, and a cluster subset handler 260, all configured to communicate with each other (e.g., via a bus, shared memory, or a switch).

The vector distance calculator 210 may be or include a distance module or other computer code programmed to calculate vector distances between or among descriptive vectors. The cluster hierarchy generator 220 may be or include a generation module or other computer code programmed to cluster descriptive vectors based on vector distances calculated by the vector distance calculator 210 and generate a tiered hierarchy of vector clusters. The score calculator 230 (e.g., hierarchy score calculator) may be or include a score module or other computer code programmed to calculate scores of the hierarchy (e.g., based on various selected values of a scalar, as will be discussed below).

The subset selector 240 (e.g., a tier selector, a hierarchy truncator, or any suitable combination thereof) may be or include a selection module or other computer code programmed to select a subset of the hierarchy (e.g., a subset defined by a tier of the hierarchy) based on the scores calculated by the score calculator 230. The descriptive vector generator 250 may be or include a description module or other computer code programmed to generate a descriptive vector (e.g., generate descriptive vectors of media items for subsequent access by the vector distance calculator 210). The cluster subset handler 260 may be or include a subset module or other computer code programmed to provide one or more interactive services based on the selected subset (e.g., selected tier) of the hierarchy (e.g., as selected by the subset selector 240).

As shown in FIG. 2, the vector distance calculator 210, the cluster hierarchy generator 220, the score calculator 230, the subset selector 240, the descriptive vector generator 250, and the cluster subset handler 260 may form all or part of an application 200 (e.g., a software application, a web applet, or a mobile app) that is stored (e.g., installed) on the clustering machine 110. Furthermore, one or more processors 299 (e.g., hardware processors, digital processors, or any suitable combination thereof) may be included (e.g., temporarily or permanently) in the application 200, the vector distance calculator 210, the cluster hierarchy generator 220, the score calculator 230, the subset selector 240, the descriptive vector generator 250, the cluster subset handler 260, or any suitable combination thereof. In some example embodiments, the application 200 is stored and executed on one of the devices 130 or 150. In certain example embodiments, the application 200 (e.g., modules thereof) is distributed across one or more of the clustering machine 110 and the devices 130 and 150.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
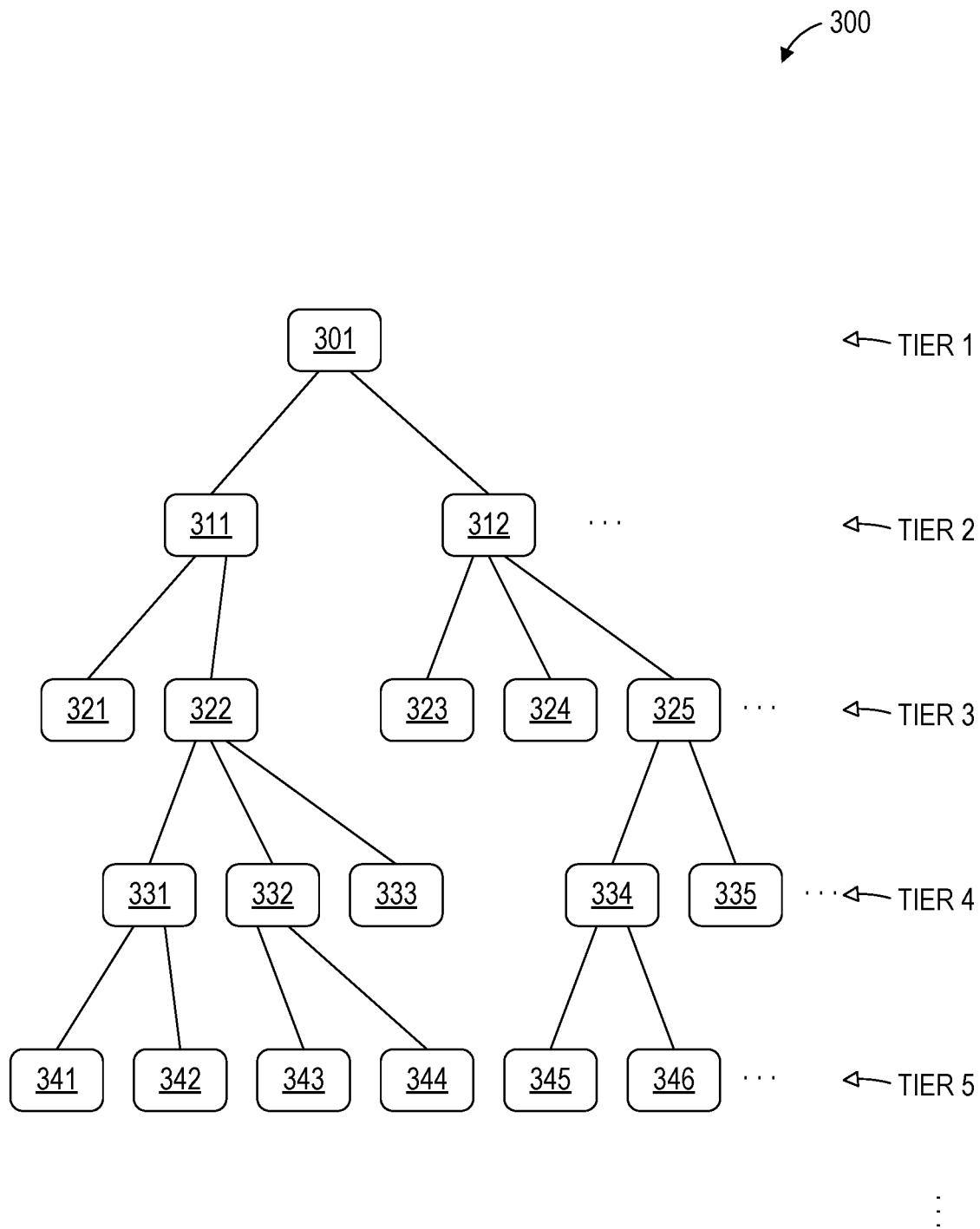
FIG. 3 is a conceptual diagram illustrating a multi-tiered hierarchy of vector clusters, according to some example embodiments.

FIG. 3 is a conceptual diagram illustrating a hierarchy 300 (e.g., a multi-tiered nested hierarchy) of vector clusters 301, 311, 312, 321, 322, 323, 324, 325, 331, 332, 333, 334, 335, 341, 342, 343, 344, 345, and 346, according to some example embodiments. The hierarchy 300 may be generated by the cluster hierarchy generator 220, for example, based on vector distances calculated by the vector distance calculator 210. For illustrative purposes, FIG. 3 shows the hierarchy 300 organized into multiple tiers, labeled Tier 1, Tier 2, Tier 3, Tier 4, and Tier 5, which may or may not be present, depending on various example embodiments.

As illustrated in FIG. 3, the hierarchy 300 has multiple tiers and is arranged so that each of the multiple tiers (e.g., Tier 3) is a subset of all vector clusters 301-346 represented in the hierarchy 300. For example, in Tier 1 of the hierarchy 300, the sole vector cluster 301 (e.g., the root node or root cluster) contains all descriptive vectors accessed by the vector distance calculator 210 and represented in the hierarchy 300. As another example, in Tier 2 of the hierarchy 300, the two vector clusters 311 and 312 subdivide (e.g., apportion) the descriptive vectors (e.g., contained in the vector cluster 301) into two groups. As a third example, in Tier 3 of the hierarchy 300, the vector clusters 321 and 322 subdivide their parent vector cluster 311, while the vector clusters 323, 324, and 325 subdivide their parent vector cluster 312. As a fourth example, in Tier 4 of the hierarchy 300, the vector clusters 331, 332, and 333 subdivide their parent vector cluster 322, and the vector clusters 334 and 335 subdivide their parent cluster 325. As a further example, in Tier 5 of the hierarchy 300, the vector clusters 341 and 342 subdivide their parent vector cluster 331; the vector clusters 343 and 344 subdivide their parent vector cluster 332; and the vector clusters 345 and 346 subdivide their parent vector cluster 334. As shown in FIG. 3 by ellipses, additional tiers may be included in the hierarchy 300, and any tier except Tier 1 (e.g., each of Tiers 2-5) can include additional vector clusters in hierarchy 300.

Figure 4:
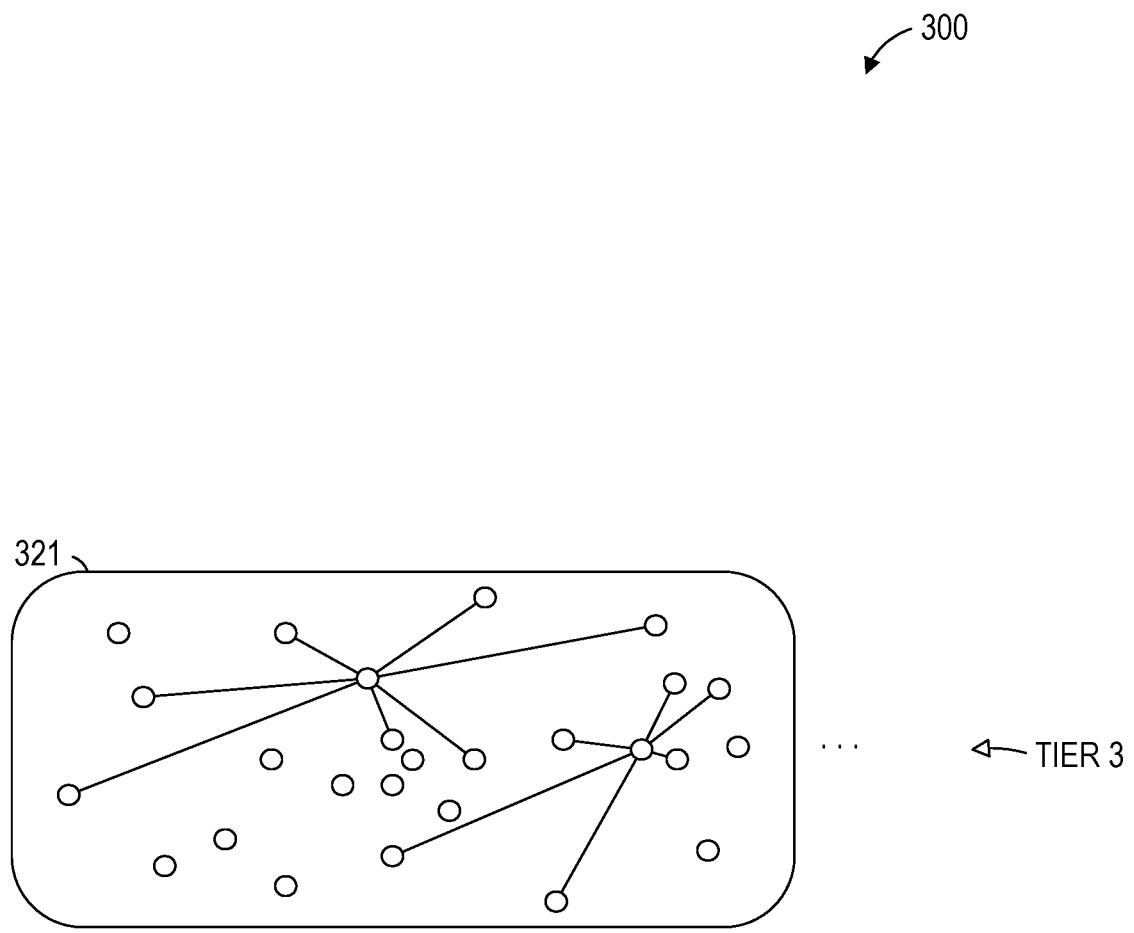
FIG. 4 is a conceptual diagram illustrating intra-cluster vector distances in a vector cluster in one of the tiers of the multi-tiered hierarchy, according to some example embodiments.

FIG. 4 is a conceptual diagram illustrating intra-cluster vector distances in the vector cluster 321 (e.g., in Tier 3) of the hierarchy 300, according to some example embodiments. Although only the vector cluster 321 is illustrated, other vector clusters (e.g., vector clusters 301-312 and 322-346) are similarly structured and can have similar vector distances between their constituent descriptive vectors.

As shown in FIG. 4, the vector cluster 321 groups multiple descriptive vectors (e.g., a plurality of descriptive vectors), each of these descriptive vectors is depicted as a small circle in FIG. 4. As used herein, an "intra-cluster vector distance" is a vector distance between two descriptive vectors that are both included (e.g., grouped or clustered) in the same vector cluster (e.g., vector cluster 321). For example, an intra-cluster vector distance can be calculated by taking a vector difference between a pair of descriptive vectors within the same vector cluster. As another example, an intra-cluster vector distance can be calculated by taking a square root of a sum of squared differences in each dimension represented by a pair of descriptive vectors from the same vector cluster. Other algorithms for calculating vector distances may be used to calculate an intra-cluster vector distance, according to various example embodiments.

In addition, any vector cluster (e.g., vector cluster 321) can be represented by a centroid vector, which can be calculated as or based on a mean vector that averages (e.g., with or without weighting) the descriptive vectors included in that vector cluster. As one example, a centroid vector of the vector cluster 321 may be calculated by calculating a mean vector of all descriptive vectors that are within the vector cluster 321. As another example, the centroid vector of the vector cluster 321 may be calculated by weighting the descriptive vectors within the vector cluster 321 according to one or more of their constituent dimensions (e.g., values that signify presence or absence of a popular mood, such as "upbeat" or "danceable," for descriptive vectors of media files) and then calculating a weighted mean vector of the descriptive vectors of the vector cluster 321.

Figure 5:
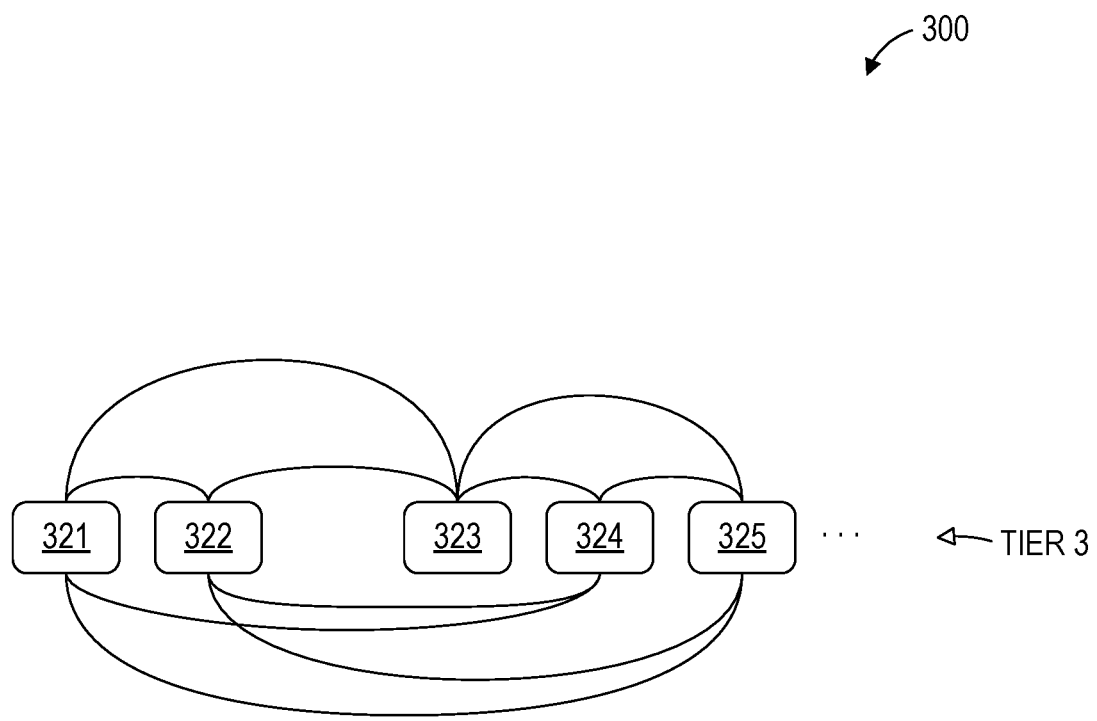
FIG. 5 is a conceptual diagram illustrating inter-cluster vector distances in one of the tiers of the multi-tiered hierarchy of vector clusters, according to some example embodiments.

FIG. 5 is a conceptual diagram illustrating inter-cluster vector distances among the vector clusters 321-325 (e.g., in Tier 3) of the hierarchy 300, according to some example embodiments. As noted above, each vector cluster (e.g., vector cluster 321) within the hierarchy 300 can be represented by a separate centroid vector. Accordingly, such centroid vectors can be used to calculate vector distances in between two vector clusters (e.g., between the vector clusters 321 and 322). An "inter-cluster vector distance," as used herein, is a vector distance between two centroid vectors of different vector clusters in the same hierarchy (e.g., hierarchy 300) of vector clusters. As one example, the inter-cluster vector distance between two vector clusters can be calculated by taking a vector difference between their centroid vectors. As another example, the inter-cluster vector distance between a pair of vector clusters can be calculated by taking a square root of the sum of squared differences in each dimension represented by their centroid vectors. Other algorithms for calculating vector distances may be used to calculate an inter-cluster vector distance, according to various example embodiments.

As shown in FIG. 5, inter-cluster vector distances can be calculated between at least the following pairs of vector clusters (e.g., in Tier 3) of the hierarchy 300: the vector clusters 321 and 322, the vector clusters 321 and 323, the vector clusters 321 and 324, the vector clusters 321 and 325, the vector clusters 322 and 323, the vector clusters 322 and 324, the vector clusters 322 and 325, the vector clusters 323 and 324, the vector clusters 323 and 325, and the vector clusters 324 and 325. Similar inter-cluster vector distances can be calculated throughout the hierarchy 300 (e.g., among all vector clusters, including the vector clusters 301-346).

For the purpose of selecting balanced clusters of descriptive vectors, it can be desirable to have the intra-cluster vector distances be relatively small or minimized and the inter-cluster vector distances be relatively large or maximized. This approach can result in identification of a clustering scheme (e.g., the specific clusters contained within a subset of vector clusters, which may be defined by a single tier, such as Tier 3, within the hierarchy 300) that provides an optimal or otherwise desirable granularity level (e.g., between the root node and the leaf nodes of the hierarchy 300). Accordingly, the identified clustering scheme can be suggested, recommended, or otherwise used to group, categorize, classify, or otherwise subdivide the descriptive vectors in a manner that results in vector clusters (e.g., vector clusters 321-325) that are balanced and neither excessively large and few nor excessively small and numerous.

Figure 6:
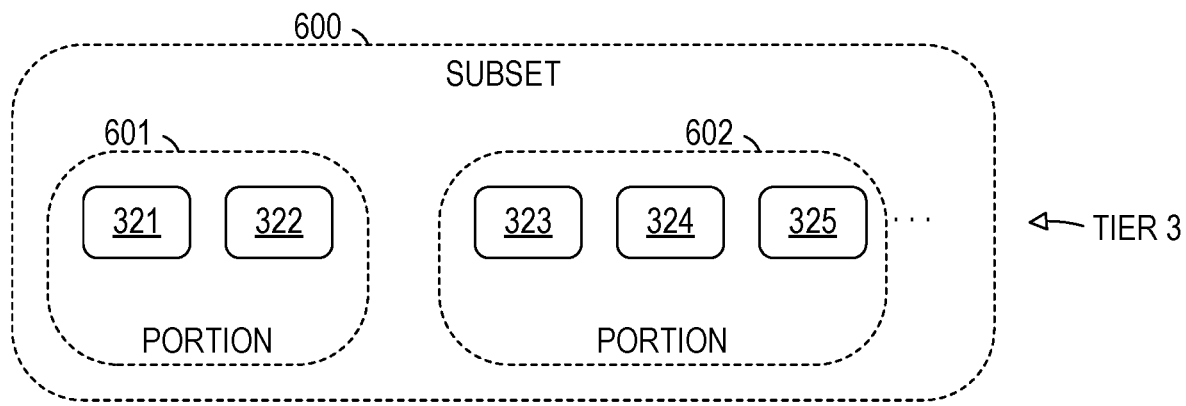
FIG. 6 is a conceptual diagram illustrating a selected subset of the vector clusters in the hierarchy being defined by selecting a tier among multiple tiers of the hierarchy, according to some example embodiments.

FIG. 6 is a conceptual diagram illustrating a selected subset 600 of the vector clusters (e.g., vector clusters 301-346) in the hierarchy 300, according to some example embodiments. As shown in FIG. 6, Tier 3 of the hierarchy 300 may define the selected subset 600 of all vector clusters in the hierarchy 300. In other words, the subset 600 may be defined by selection of a tier (e.g., Tier 3) among the multiple tiers of the hierarchy 300, and such a selection may be based on analysis of the intra-cluster vector distances in the hierarchy 300 (e.g., as discussed above with respect to FIG. 4) and the inter-cluster vector distances in the hierarchy 300 (e.g., as discussed above with respect to FIG. 5).

Accordingly, the vector clusters (e.g., vector clusters 321-325) of the selected subset 600 of the hierarchy 300 can be suggested, recommended, or otherwise used to group the descriptive vectors represented in the hierarchy 300. For example, the vector clusters (e.g., vector clusters 321-325) of the selected subset 600 of the hierarchy 300 can be presented in a user interface (e.g., a graphical user interface (GUI)) as a balanced or otherwise optimal clustering scheme (e.g., categorization scheme) for organizing, or otherwise managing the items (e.g., data items, such as media files) described by the descriptive vectors.

In some example embodiments, the selected subset 600 has clustered descriptive vectors that describe items (e.g., data items, such as media files) from multiple sources (e.g., a first source, such as a first recording artist, and a second source, such as a second recording artist). The vector clusters in the selected subset 600 (e.g., vector clusters 321-325) can themselves be clustered into multiple portions 601 and 602. This may have the effect of subdividing the selected subset 600 of the hierarchy 300 in a manner that allows disambiguation of the multiple sources for the items described by the descriptive vectors. In other words, those items from the first source (e.g., first artist) may have descriptive vectors that are clustered in the portion 601 (e.g., first portion) of the subset 600, while those items from the second source (e.g., second artist) may have descriptive vectors that are clustered in the portion 602 (e.g., second portion) of the subset 600.

Figure 7:
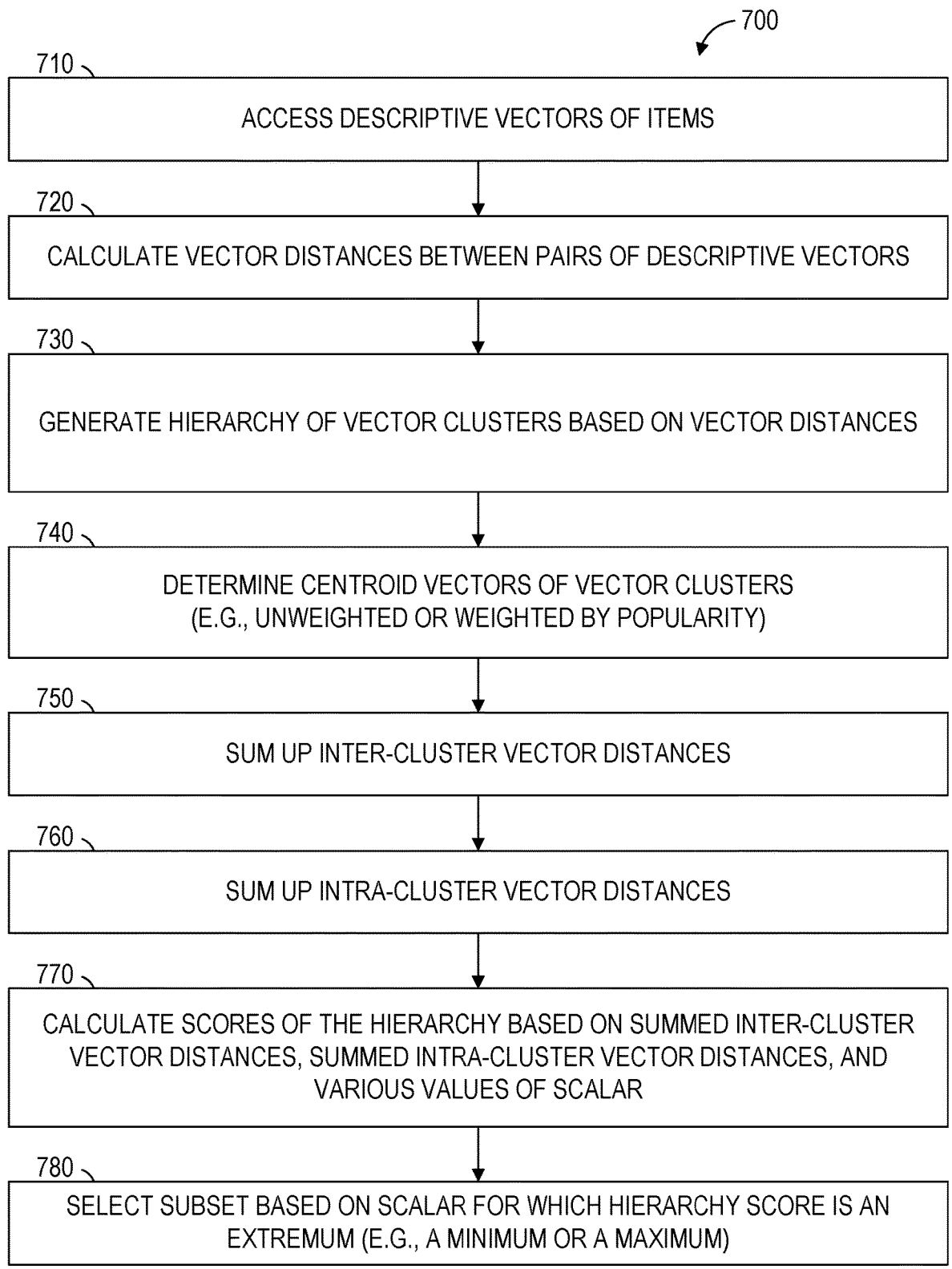
FIGS. 7-10 are flowcharts illustrating operations of the clustering machine in performing a method of selecting balanced clusters of descriptive vectors, according to some example embodiments.

FIGS. 7-10 are flowcharts illustrating operations in a method 700 of selecting balanced clusters of descriptive vectors, according to some example embodiments. Operations in the method 700 may be performed by the clustering machine 110, one or more the devices 130 and 150, or any suitable combination thereof, using components (e.g., modules) described above with respect to FIG. 2, using one or more processors 299 (e.g., microprocessors or other hardware processors), or using any suitable combination thereof. As shown in FIG. 7, the method 700 includes operations 710, 720, 730, 740, 750, 760, 770, and 780.

In operation 710, the vector distance calculator 210 accesses descriptive vectors to be analyzed and clustered. This may be performed by reading, retrieving, or otherwise accessing descriptive vectors stored in the database 115. As noted above, each descriptive vector may have multiple different dimensions whose values indicate multiple different extents to which multiple different characteristics are present in a particular item (e.g., a data item, such as a media file) described by the descriptive vector.

In operation 720, the cluster hierarchy generator 220 calculates vector distances between pairs (e.g., all pairs) of the descriptive vectors accessed in operation 710. As one example, the vector distance between a pair of descriptive vectors may be calculated by taking a vector difference between the two descriptive vectors in the pair. As another example, the vector distance between two descriptive vectors may be calculated by taking the square root of the sum of squared differences in each dimension of the two descriptive vectors. Other algorithms for calculating a vector distance between two descriptive vectors may be used, according to various example embodiments.

In operation 730, the cluster hierarchy generator 220 generates the hierarchy 300 of vector clusters (e.g., vector clusters 301-346). The hierarchy 300 may be generated in memory within the clustering machine 110, in the database 115, or any suitable combination thereof. Moreover, the hierarchy 300 may be generated by clustering the descriptive vectors into the vector clusters 301-346 based on the vector distances calculated in operation 720. In some example embodiments, this clustering of the descriptive vectors may have the effect of organizing the descriptive vectors and the vector clusters (e.g., vector clusters 301-346) into multiple tiers of the hierarchy 300 (e.g., Tiers 1-5). In other example embodiments, the vector clusters (e.g., vector clusters 301-346) are formed without arranging them into any tiers within the hierarchy 300.

In operation 740, the score calculator 230 determines (e.g., by calculating or generating) centroid vectors of the vector clusters (e.g., all vector clusters, including the vector clusters 301-346) in the generated hierarchy 300 of vector clusters. As noted above, the centroid vectors may be determined by calculating weighted or unweighted mean vectors for the vector clusters (e.g., vector clusters 301-346) of the hierarchy 300. Accordingly, each of the vector clusters in the hierarchy 300 can be represented by its corresponding centroid vector, as determined in operation 740.

In operation 750, the score calculator 230 sums the inter-cluster vector distances between pairs of the centroid vectors determined in operation 740. That is, the score calculator 230 calculates inter-cluster vector distances between all pairs of the vector clusters (e.g., vector clusters 301-346) in the hierarchy 300, and then adds these inter-cluster vector distances to obtain a sum (e.g., first sum) of the inter-cluster vector distances.

In operation 760, the score calculator 230 sums the intra-cluster vector distances between descriptive vectors in each of the vector clusters (e.g., vector clusters 301-346) the hierarchy 300. In other words, the score calculator 230 calculates intra-cluster vector distances between all descriptive vectors within a given vector cluster (e.g., vector cluster 311 or 321), and similar intra-cluster vector distances are calculated on a cluster-by-cluster basis for all other vector clusters (e.g., vector clusters 301-346) in the hierarchy 300. All of these inter-cluster vector distances are then added together to obtain a sum (e.g., second sum) of the intra-cluster vector distances.

In operation 770, the score calculator 230 calculates scores (e.g., granularity scores, suitability scores, optimization scores, or any suitable combination thereof) of the hierarchy 300. The scores are calculated based on the results of operations 750 and 760. Specifically, the scores are calculated based on the summed inter-cluster vector distances (e.g., the first sum, as calculated in operation 750) and based on the summed intra-cluster vector distances (e.g., the second sum, as calculated in operation 760). Furthermore, the scores are calculated based on various values of a scalar, which may be selected by score calculator 230 from a range of scalar values (e.g., between zero and one (unity)), such that each calculated score corresponds to a different selected scalar value (e.g., results from a different selected scalar value). For example, the score calculator 230 may vary the scalar within a predetermined range of values (e.g., between zero and one) and perform a calculation of a score of the hierarchy 300 for each separately selected value of the scalar. Accordingly, a distribution of calculated scores of the hierarchy 300 may be obtained from the various scalars selected. A particular scalar (e.g., a particular scalar value) among the selected scalars (e.g., within the range of scalar values) corresponds to (e.g., results in) an extreme score (e.g., a minimum score or maximum score) among the calculated scores. Additional details of operation 770 are discussed below with respect to FIG. 9, according to various example embodiments.

In operation 780, the subset selector 240 selects (e.g., identifies, chooses, or otherwise designates as being selected) the subset 600 of the hierarchy 300. In particular, the subset 600 may be selected based on the particular scalar that corresponds to (e.g., resulting in) the extreme score (e.g., the minimum score or the maximum score) among the calculated scores from operation 770. Accordingly, operation 780 may include determining which calculated score among the calculated scores of the hierarchy 300 is the extreme score (e.g., the minimum score for the maximum score).

Figure 8:
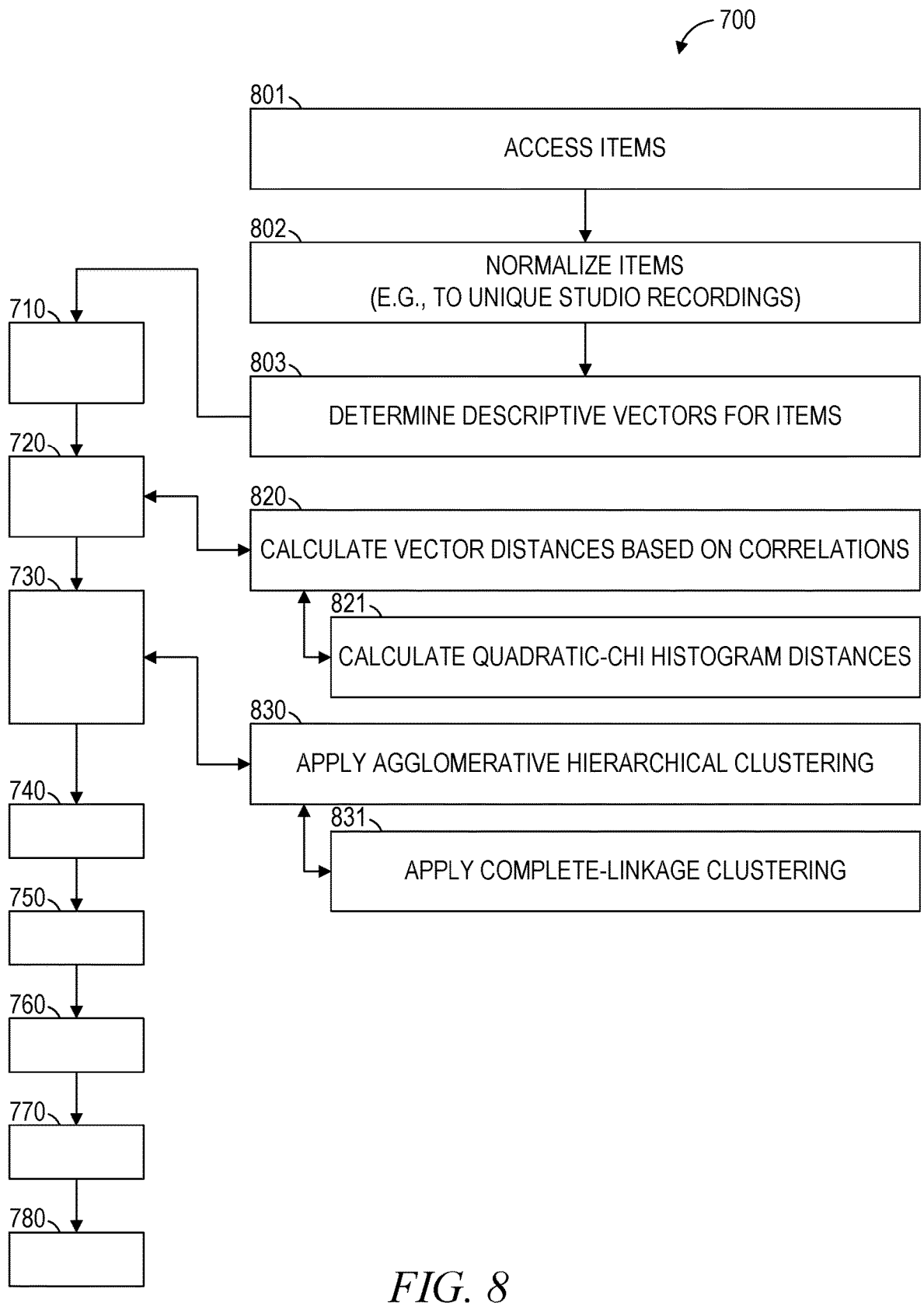

As shown in FIG. 8, in addition to any one or more of the operations previously described, the method 700 may include one or more of operations 801, 802, 810, 820, 821, 830, and 831. Any one or more of operations 801, 802, and 803 may be performed prior operation 710, in which the vector distance calculator 210 accesses the descriptive vectors to be analyzed.

In operation 801, the descriptive vector generator 250 accesses data items (e.g., media files, each containing different media content) that are describable by descriptive vectors (e.g., descriptive vectors to be generated in operation 802). According to various example embodiments, the accessed data items may be or include media items (e.g., media files), identifiers of media items, identifiers of physical items, or any suitable combination thereof. For example, the descriptive vector generator 250 may access a library (e.g., catalog) of media files (e.g., audio files that each contain a different song) stored by the database 115 or by one of the devices 130 or 150.

In operation 802, the descriptive vector generator 250 normalizes the data items accessed in operation 801. This normalization process may include omitting duplicate data items (e.g., media items), omitting non-original data items, omitting data items included in data compilations (e.g., media items released on compilation albums), omitting data items recorded at live performances, retaining data items recorded in studios, or any suitable combination thereof.

In operation 803, the descriptive vector generator 250 determines descriptive vectors for the data items accessed in operation 801 (e.g., and normalized in operation 802). In some cases, existing descriptive vectors (e.g., stored in the database 115) are overwritten or updated. In other cases, new descriptive vectors are freshly generated (e.g., and stored in the database 115). Accordingly, performance of operation 803 generates a different descriptive vector for each of the data items accessed in operation 801. In certain example embodiments in which the accessed data items are media files, the generating of each different descriptive vector includes analyzing media content in the corresponding media file and generating the descriptive vector for that media file based on the analyzed media content. The descriptive vectors generated in operation 803 may accordingly be accessed by the vector distance calculator 210 in performing operation 710.

Operation 820 may be performed as part (e.g., a precursor task, a subroutine, or a portion) of operation 720, in which the cluster hierarchy generator 220 calculates vector distances between pairs of descriptive vectors. In operation 820, the cluster hierarchy generator 220 calculates one or more of the vector distances based on correlations (e.g., calculated statistical correlations) among the descriptive vectors. Accordingly, performance of operation 820 may include performing calculations of statistical correlation between pairs of descriptive vectors (e.g., based on scalar values for their dimensions).

In some example embodiments, operation 821 is performed as part of operation 820. In operation 821, as part of calculating one or more of the vector distances based on correlations among the descriptive vectors, the cluster hierarchy generator 220 calculates one or more quadratic-chi histogram distances between the pairs of descriptive vectors. Accordingly, the calculation of the vector distances between the pairs of descriptive vectors in operation 720 may be based on these calculated quadratic-chi histogram distances resultant from operation 821.

Operation 830 may be performed as part of operation 730, in which the cluster hierarchy generator 220 generates the hierarchy 300 of vector clusters (e.g., vector clusters 301-346). In operation 830, the cluster hierarchy generator 220 applies agglomerative hierarchical clustering to the descriptive vectors accessed in operation 710. Thus, the clustering of the descriptive vectors into the vector clusters 301-346 in operation 730 may be performed according to, or otherwise based on, an agglomerative hierarchical clustering algorithm. This may have the effect of causing the hierarchy 300 to be generated as a nested and agglomeratively clustered hierarchy of vector clusters.

In some example embodiments, operation 831 is performed as part of operation 830. In operation 831, as part of applying the agglomerative hierarchical clustering algorithm, the cluster hierarchy generator 220 applies complete-linkage clustering to the descriptive vectors accessed in operation 710. Thus, the clustering of the descriptive vectors into the vector clusters 301-346 in operation 730 may be performed according to, or otherwise based on, a complete-linkage clustering algorithm. This may have the effect of causing the hierarchy 300 to be generated as a nested, agglomeratively clustered, and complete-linkage clustered hierarchy of vector clusters.

Figure 9:
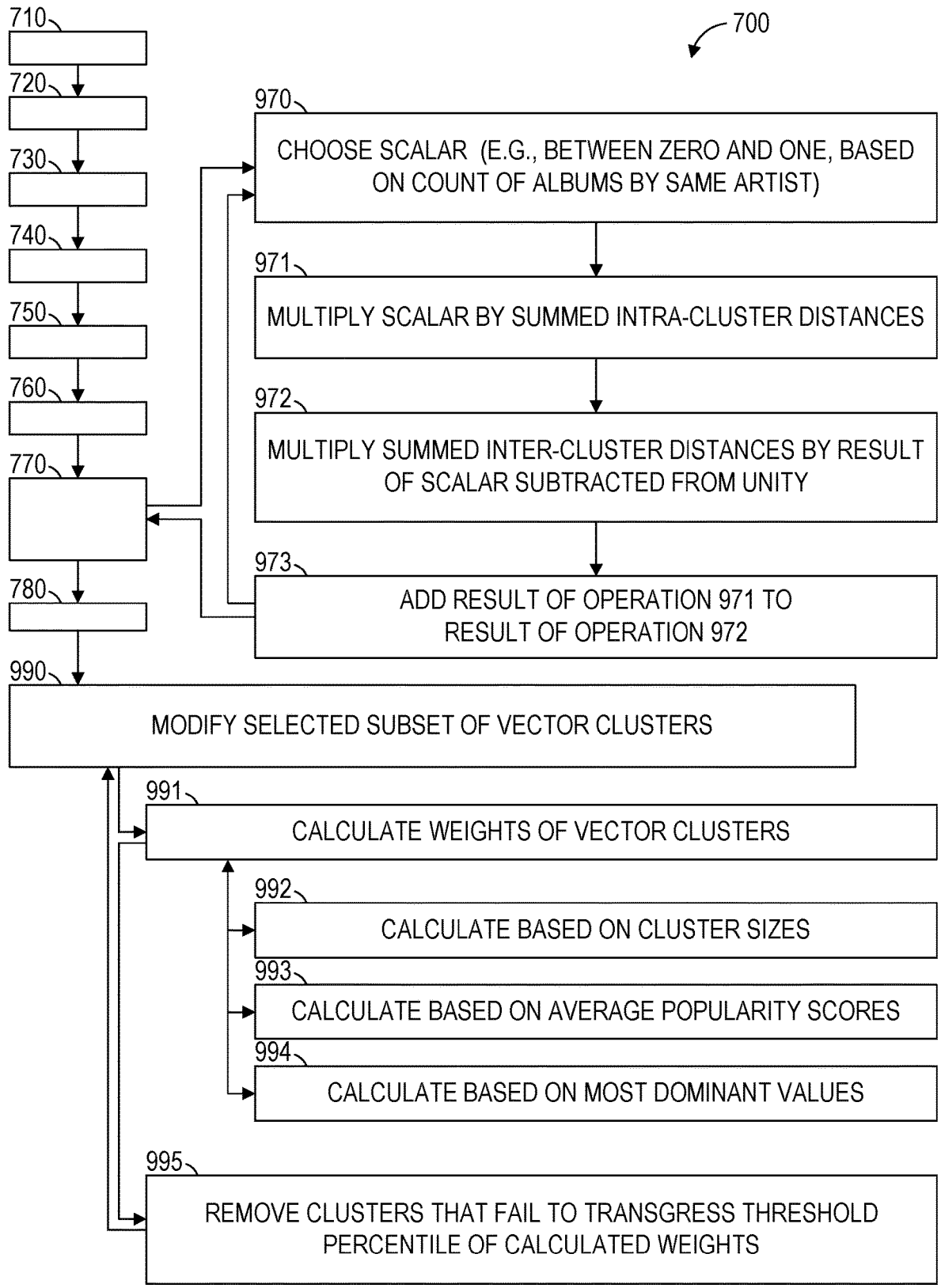

As shown in FIG. 9, in addition to any one or more of the operations previously described, the method 700 may include one or more of operations 970, 971, 972, 973, 990, 991, 992, 993, 994, and 995. Operations 970, 971, 972, and 973 may be performed as part of operation 770, in which the score calculator 230 calculates scores of the hierarchy 300. As noted above, the calculated scores may correspond to different values of a scalar.

In operation 970, the score calculator 230 selects (e.g., automatically chooses) a scalar between zero and one (unity). This scalar is a numerical value that may represent a candidate level of granularity for selecting the subset 600 as a balanced subset of the vector clusters (e.g., vector clusters 321-325) in the hierarchy 300. In some example embodiments, a scalar value of zero corresponds to maximum granularity (e.g., every descriptive vector by itself is its own vector cluster, while a scalar value of one (unity) corresponds to minimum granularity (e.g., all descriptive vectors are clustered into a single vector cluster, such as the vector cluster 301). In certain example embodiments, this selected scalar may correspond to a tier (e.g., Tier 3) among the multiple tiers of the hierarchy 300, though in alternative example embodiments, the selected scalar is independent of any of the multiple tiers of the hierarchy 300.

According to some example embodiments, the selection of the scalar is preconfigured (e.g., programmed or hard-coded), while in other example embodiments, the selection of the scalar is based on user input (e.g., submitted by the user 132 via the device 130 and received by the clustering machine 110 via the network 190). In certain example embodiments, the selection of the scalar is based on metadata (e.g., stored in the database 115 and accessed therefrom) regarding some or all of the descriptive vectors accessed in operation 710 (e.g., a count of albums by a same single artist that recorded media files described by the descriptive vectors). Thus, in such example embodiments, the scalar (e.g., the value of the scalar) may be selected based on the size of an artist's catalog (e.g., number of albums).

In operation 971, the score calculator 230 multiplies the scalar selected in operation 970 by the sum of the intra-cluster vector distances (e.g., the second sum) calculated in operation 760. The result (e.g., product) of this multiplication can be referred to as a first multiplicative product.

In operation 972, the score calculator 230 subtracts the scalar selected in operation 970 from one (unity) to obtain an intermediate result and multiplies this intermediate result by the sum of inter-cluster vector distances (e.g., the first sum) calculated in operation 750. The result (e.g., product) of this multiplication can be referred to as a second multiplicative product.

In operation 973, the score calculator 230 adds the result of operation 971 to the results of operation 972, thus calculating a sum (e.g., third sum) of the first multiplicative product and the second multiplicative product. This calculated sum may be treated as a calculated score of the hierarchy 300 (e.g., among multiple calculated scores of the hierarchy 300), and this calculated score may correspond to the selected scalar, at least in the sense that the selected scalar resulted in this calculated score.

Operations 970-973 may be repeated for multiple values of the scalar to obtain a set (e.g., distribution) of calculated scores for the hierarchy 300. As noted above, performance of operation 780 may include determining that one of the calculated scores is an extreme score (e.g., minimum score or maximum score), such that the scalar (e.g., scalar value) that corresponds to the extreme score (e.g., that resulted in the minimum or maximum score) is identified for use in operation 780 (e.g., for use in selecting the subset 600 of the hierarchy 300).

Operation 990 may be performed after operation 780, in which the subset selector 240 selects the subset 600 of the hierarchy 300 based on the scalar that corresponds to the extreme score among the calculated scores from operation 770. In operation 990, the selected subset 600 of vector clusters is modified by the cluster subset handler 260. Such modification of the subset 600 can include removal of one or more vector clusters (e.g., vector cluster 325) from the subset 600. For this purpose, operations 991 and 995 may be performed as part of operation 990.

In operation 991, the cluster subset handler 260 calculates weights of the vector clusters (e.g., vector clusters 321-325) in the selected subset 600 of vector clusters. According to various example embodiments, this calculation of weights may be performed by executing one or more of operations 992, 993, and 994, which may be performed as part of operation 991. Accordingly, a separate weight is calculated for each vector cluster in the subset 600, for example, such that the first weight corresponds to a first vector cluster (e.g., vector cluster 321) in the selected subset 600, a second weight corresponds to a second vector cluster (e.g., vector cluster 322) in the selected subset 600, and so on.

In some example embodiments, the weights of the vector clusters are calculated based on sizes of the vector clusters. Hence, in operation 992, the cluster subset handler 260 determines the sizes of the vector clusters in the selected subset 600 (e.g., counts of descriptive vectors in the vector clusters 321-325) and calculates the weights of these vector clusters based on their determined sizes (e.g., counts of descriptive vectors).

In certain example embodiments, the weights of the vector clusters are calculated based on average popularity scores of the vector clusters. Hence, in operation 993, the cluster subset handler 260 calculates popularity scores for a group of items (e.g., data items, such as media items) described by at least some of the descriptive vectors in a vector cluster (e.g., vector cluster 321) from the selected subset 600 of vector clusters. The cluster subset handler 260 then calculates an average (e.g., arithmetic mean) of these popularity scores, and the weight of the vector cluster (e.g., vector cluster 321) is then calculated based on this average popularity score. This process may be repeated for each vector cluster (e.g., vector clusters 322-325) in the selected subset 600.

In various example embodiments, the weights of the vector clusters are calculated based on extents to which the vector clusters are dominated by their primary moods. Hence, in operation 994, the cluster subset handler 260 calculates the weights of the vector clusters based on values of the most dominant dimensions in their encompassed descriptive vectors. For example, in calculating a weight of a vector cluster (e.g., vector cluster 321) represented by a centroid vector, the cluster subset handler 260 may calculate a ratio between a most dominant value of the most dominant dimension in the centroid vector and a sum of less dominant values of less dominant dimensions in the centroid vector. This ratio represents a degree of dominance by the most dominant dimension, and where the most dominant dimension represents a primary mood, the ratio represents an extent to which the primary mood dominates the vector cluster (e.g., vector cluster 321). This calculation may be repeated for each vector cluster (e.g., vector clusters 322-325) in the selected subset 600).

In operation 995, the cluster subset handler 260 removes (e.g., deletes or otherwise omits) any vector clusters that fail to transgress a predetermined threshold percentile of the weights calculated in operation 991. This may include determining a range of the weights calculated in operation 991, calculating a threshold weight based on the predetermined threshold percentile, and comparing each of the calculated weights from operation 991 to the threshold weight, to determine which vector clusters have weights that transgress the threshold weight and which vector clusters have weights that fail to transgress the threshold weight.

Figure 10:
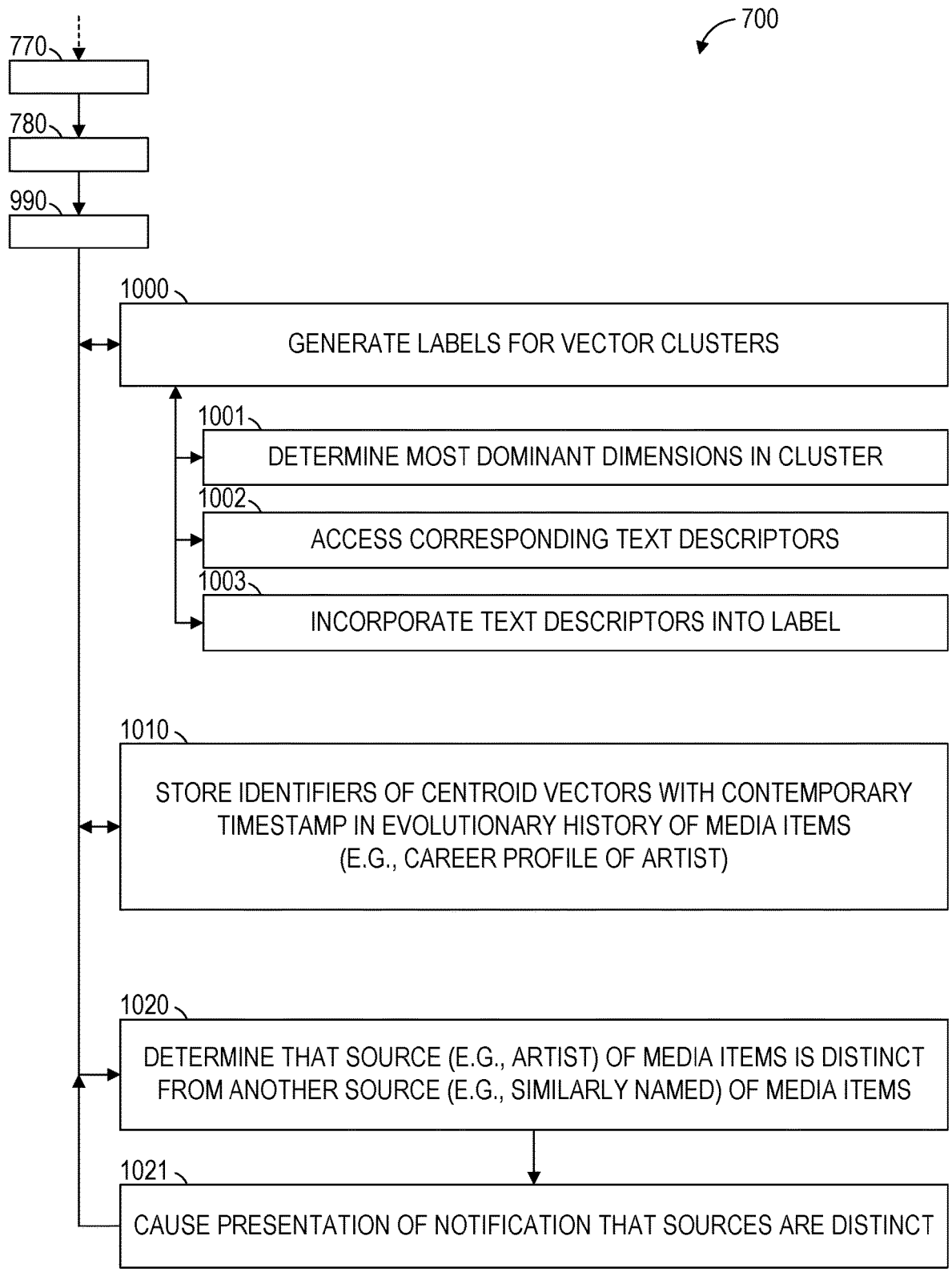

As shown in FIG. 10, in addition to any one or more of the operations previously described, the method 700 may include one or more of operations 1000, 1001, 1002, 1003, 1010, 1020, and 1021. One or more of these operations may be performed after operation 780, in which the subset selector 240 selects the subset 600 of the hierarchy 300 of vector clusters, or performed after operation 990, in which the cluster subset handler 260 modifies the selected subset 600 of the hierarchy 300, or performed after both.

In some example embodiments, the application 200 is configured to perform automatic cluster labeling, and accordingly, in operation 1000, the cluster subset handler 260 generates labels (e.g., single-word or multi-word text descriptors) for one or more vector clusters in the subset 600 (e.g., modified or unmodified). For example, a first vector cluster (e.g., vector cluster 321) in the selected tier (e.g., Tier 3) of the hierarchy 300 may be labeled by a first label, a second vector cluster (e.g., vector cluster 322) in the same tier may be labeled with a second label, and so on. Each of these labels may be generated based on the centroid vector of the corresponding vector cluster (e.g., with the first label being generated based on the centroid vector of vector cluster 321). Furthermore, generation of a label (e.g., first label) for a vector cluster (e.g., first vector cluster, such as vector cluster 321) may be accomplished by performing one or more of operations 1001, 1002, and 1003, each of which may be performed as part of operation 1000. Operations 1001-1003 may be repeated for additional vector clusters (e.g., vector clusters 322-325).

In operation 1001, for a first centroid vector of the first vector cluster (e.g., vector cluster 321), the cluster subset handler 260 determines a set of most dominant dimensions (e.g., top one, top two, or top five most dominant moods represented by dimensions) in the first centroid vector. As noted above, most dominant dimensions have the most dominant (e.g., highest) values in a given centroid vector.

In operation 1002, for the first vector cluster (e.g., vector cluster 321), the cluster subset handler 260 accesses the database 115, which in such example embodiments stores a correspondence relationship between the set of most dominant dimensions and one or more corresponding textual descriptors. That is, the database 115 maps the set of most dominant dimensions to textual descriptors of those dimensions. In some example embodiments, each dimension (e.g., representing a mood, such as "aggressive") is mapped to a separate textual descriptor (e.g., a word, such as "aggressive," or a phrase, such as "mean-sounding" or "in your face"). Accordingly, the cluster subset handler 260 can obtain one or more textual descriptors that correspond to the determined set of most dominant dimensions from operation 1001.

In operation 1003, for the first vector cluster (e.g., vector cluster 321), the cluster subset handler 260 incorporates the accessed textual descriptors into the first label to be applied to the first vector cluster, thus fully or partially generating the first label of the first vector cluster. As noted above, the process described with respect operations 1001-1003 may be repeated for additional vector clusters to be labeled (e.g., vector clusters 322-325).

In certain example embodiments, the application 200 is configured to perform tracking or other analysis of musical moods by a recording artist over time. According to such example embodiments, the descriptive vectors accessed in operation 710 are already known to describe the items recorded by a single same artist. For example, operation 710 may have been performed by accessing only descriptive vectors of media files in a library of works by that artist.

Accordingly, in operation 1010, the cluster subset handler 260 makes a record of the selected subset 600 (e.g., in the database 115). This may be accomplished by storing the centroid vectors of the selected subset 600 (e.g., modified or unmodified) or identifiers of the centroid vectors in the database 115. Moreover, the centroid vectors or identifiers thereof may be stored with a timestamp (e.g., current date, current time, or both).

Performance of operation 1010 may have the effect of taking a contemporary "snapshot" of the centroid vectors, which may form all or part of an evolutionary history of works by the artist. That is, the centroid vectors or identifiers thereof can indicate primary or dominant moods evoked by the artist's works (e.g., media files), as analyzed by the clustering machine 110. Over time, as the artist releases additional works, and as additional "snapshots" of these primary or dominant moods are recorded in the database 115, the network-based system 105 can provide mood tracking services or other mood analysis services to the users 132 and 152, in regard to how the artist's musical moods have evolved over time (e.g., during the artist's career).

In various example embodiments, the application 200 is configured to disambiguate sources (e.g., recording artists) of items (e.g., media files), even though the sources have similar names or have the same name, based on analysis of descriptive vectors for the items (e.g., descriptive vectors describing musical moods). For example, to disambiguate recording artists, the application 200 is configured to detect differences in the dominant or primary moods evoked by works released by the artists or otherwise sourced from the artists. According to such example embodiments, the descriptive vectors accessed in operation 710 are already known to describe a collection of items (e.g., media files) sourced from (e.g., released by) more than one source (e.g., more than one artist). As an example, the descriptive vectors accessed in operation 710 may describe all media files aggregated from multiple libraries of media files by multiple artists who have the same name or who have similar names (e.g., a flamenco guitarist named "Freddo" and a death metal band named "F.R.E.D.D.O.," whose name sometimes is written as "FREDDO"). In accordance with various example embodiments, artist disambiguation may be accomplished by performing operations 1020 and 1021.

In operation 1020, the cluster subset handler 260 determines that a first source (e.g., first artist) of items (e.g., media items) is distinct from a second source (e.g., second artist) of items. As noted above, this may be performed by grouping the vector clusters of the selected tier (e.g., vector clusters 321-325 in Tier 3) of the hierarchy 300 into multiple portions (e.g., portions 601 and 602) of the selected subset 600 of the hierarchy 300. For example, the cluster subset handler 260 may calculate vector distances between centroid vectors of the vector clusters 321-325 and use these vector distances to subdivide the subset 600 into the portion 601 (e.g., first portion) and the portion 602 (e.g., second portion).

In operation 1021, the cluster subset handler 260 causes presentation of a notification (e.g., an alert or other message within a GUI) that the first and second sources are distinct. The notification may be presented to one of the users 132 or 152 via the network 190 and their respective devices 130 or 150. This may be performed in response or fulfillment of a request to analyze the items (e.g., media files) represented by the descriptive vectors accessed in operation 710. For example, the notification may indicate that the items likely come from at least two different sources, provide labels (e.g., generated in operation 1000) of vector clusters (e.g., vector clusters 321 and 322) in each of the portions 601 and 602, or both. According to certain example embodiments, the cluster subset handler 260 generates the notification (e.g., including generating labels for the portions 601 and 602, such as by concatenating or otherwise combining text descriptors accessed in operation 1002).

According to various example embodiments, one or more of the methodologies described herein may facilitate automatic selection of balanced clusters of descriptive vectors. Moreover, one or more of the methodologies described herein may facilitate identification, selection, and recommendation of a balanced or otherwise optimal clustering scheme (e.g., categorization scheme) for organizing, or otherwise managing items (e.g., data items, such as media files) described by descriptive vectors. Hence, one or more of the methodologies described herein may facilitate faster, more convenient, and more meaningful understanding of items described by descriptive vectors, as well as similarly improved applications for exploring, suggesting, recommending, choosing, purchasing, deleting, or omitting such items.

When these effects are considered in aggregate, one or more of the methodologies described herein may obviate a need for certain efforts or resources that otherwise would be involved in automatic selection of balance clusters of descriptive vectors. Efforts expended by a user in creating and maintaining a catalog of items may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 11:
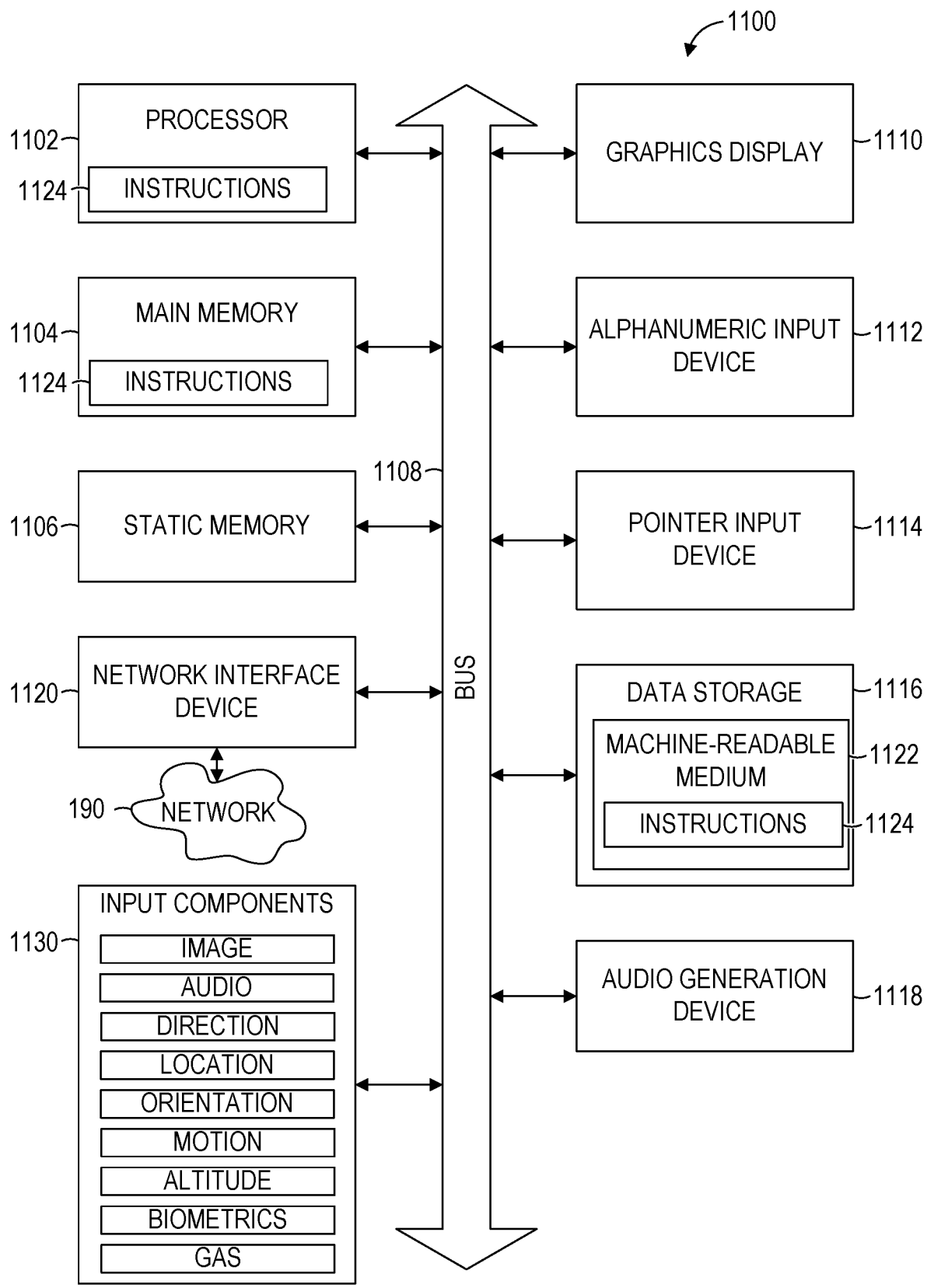
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1104, and a static memory 1106, which are configured to communicate with each other via a bus 1108. The processor 1102 contains solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1100 with at least the processor 1102, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a pointer input device 1114 (e.g., a mouse, a touchpad, a touchscreen, a trackball, a joystick, a stylus, a motion sensor, an eye tracking device, a data glove, or other pointing instrument), a data storage 1116, an audio generation device 1118 (e.g., a sound card, an amplifier, a speaker, a headphone jack, or any suitable combination thereof), and a network interface device 1120.

The data storage 1116 (e.g., a data storage device) includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the static memory 1106, within the processor 1102 (e.g., within the processor's cache memory), or any suitable combination thereof, before or during execution thereof by the machine 1100. Accordingly, the main memory 1104, the static memory 1506, and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device (e.g., a smart phone, a tablet computer, or a wearable device), and may have one or more additional input components 1130 (e.g., sensors or gauges). Examples of such input components 1130 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1124 for execution by the machine 1100 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1124).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:

accessing, by one or more processors, descriptive vectors that describe items, each descriptive vector having multiple dimensions whose values indicate extents to which multiple characteristics are present in a different item among the items;

calculating, by the one or more processors, vector distances between pairs of the descriptive vectors;

generating, by the one or more processors, a hierarchy of vector clusters by clustering the descriptive vectors into the vector clusters based on the calculated vector distances;

determining, by the one or more processors, centroid vectors of the vector clusters in the hierarchy by calculating mean vectors of the vector clusters, each mean vector and each centroid vector representing a different vector cluster in the hierarchy;

summing, by the one or more processors, inter-cluster vector distances between pairs of the centroid vectors;

summing, by the one or more processors, intra-cluster vector distances between pairs of descriptive vectors in each of the vector clusters;

calculating, by the one or more processors, scores of the hierarchy based on the summed inter-cluster vector distances and on the summed intra-cluster vector distances, each of the scores being calculated based on a different scalar among a plurality of scalars among which a scalar corresponds to an extreme score among the calculated scores; and selecting, by the one or more processors, a subset of the vector clusters in the hierarchy based on the scalar that corresponds to the extreme score.

A second embodiment provides a method according to the first embodiment, further comprising:

accessing the items prior to the accessing of the descriptive vectors, each of the items including different media content; and determining the descriptive vectors by generating a different descriptive vector for each of the items, the generating of each different descriptive vector including analyzing the media content in the corresponding item to be described.

A third embodiment provides a method according to the second embodiment, wherein:

the accessed items are media items;

the method further comprises normalizing the media items by at least one of: omitting duplicate media items, omitting non-original media items, omitting media items released on compilation albums, omitting media items recorded at live performances, or retaining media items recorded in studios; and the determining of the descriptive vectors is performed by generating a different descriptive vector for each of the normalized media items.

A fourth embodiment provides a method according to any of the first through third embodiments, wherein:

the calculating of the vector distances between the pairs of the descriptive vectors is based on correlations among the descriptive vectors.

A fifth embodiment provides a method according to any of the first through fourth embodiments, wherein:

the calculating of the vector distances between the pairs of the descriptive vectors includes calculating quadratic-chi histogram distances between the pairs of the descriptive vectors.

A sixth embodiment provides a method according to any of the first through fifth embodiments, wherein:

the clustering of the descriptive vectors is performed according to an agglomerative hierarchical clustering algorithm.

A seventh embodiment provides a method according to the fifth embodiment, wherein:

the agglomerative hierarchical clustering algorithm includes a complete-linkage clustering algorithm.

An eighth embodiment provides a method according to any of the first through seventh embodiments, wherein:

the calculating of each score of the hierarchy includes:

selecting a scalar between zero and unity;

multiplying the scalar by the summed intra-cluster vector distances to obtain a first multiplicative product;

multiplying the summed inter-cluster vector distances by the scalar subtracted from unity to obtain a second multiplicative product; and adding the first multiplicative product to the second multiplicative product to obtain the score of the hierarchy.

A ninth embodiment provides a method according to the eighth embodiment, wherein:

the items are media items released in a set of albums by a same artist; and the selecting of the scalar is based on a count of albums in the set of albums by the same artist.

A tenth embodiment provides a method according to any of the first through ninth embodiments, further comprising:

modifying the selected subset of the vector clusters in the hierarchy, the modifying of the selected subset including:

calculating weights of vector clusters in the selected subset, a first calculated weight corresponding to a first vector cluster in the selected subset;

removing a first vector cluster from the selected subset based on the first calculated weight failing to transgress a threshold percentile of the calculated weights of the vector clusters in the selected subset.

An eleventh embodiment provides a method according to the tenth embodiment, wherein:

the calculating of the weights of vector clusters in the selected subset is based on sizes of vector clusters in the selected subset, the first calculated weight being calculated based on a count of descriptive vectors in the first vector cluster within the selected subset.

A twelfth embodiment provides a method according to the tenth embodiment or the eleventh embodiment, wherein:

the calculating of the weights of vector clusters in the selected subset is based on average popularity scores of vector clusters in the selected subset, the first calculated weight being calculated based on an average of a group of popularity scores that correspond to a group of items described by at least some descriptive vectors in the first vector cluster within the selected subset.

A thirteenth embodiment provides a method according to any of the tenth through twelfth embodiments, wherein:

the calculating of the weights of vector clusters in the selected subset is based on values of most dominant dimensions of descriptive vectors in vector clusters in the selected subset, the first vector cluster having a first centroid vector among the centroid vectors, the first calculated weight being calculated based on a ratio of a most dominant value of a most dominant dimension in the first centroid vector of the first vector cluster to a sum of less dominant values of less dominant dimensions in the first centroid vector of the first vector cluster.

A fourteenth embodiment provides a method according to any of the first through thirteenth embodiments, further comprising:

generating labels that identify vector clusters in the selected subset of the hierarchy, a first label identifying a first vector cluster in the selected subset, the first vector cluster having a first centroid vector among the centroid vectors, the first label being generated by:

determining a set of most dominant dimensions in the first centroid vector of the first vector cluster, the set of most dominant dimensions having most dominant values in the first centroid vector;

accessing a database that maps the set of most dominant dimensions to corresponding textual descriptors; and incorporating the textual descriptors into the first label.

A fifteenth embodiment provides a method according to the first through fourteenth embodiments, wherein:

the descriptive vectors that describe the items are mood vectors that describe media items all recorded by a same artist, each mood vector indicating extents to which multiple emotions are perceivable in a different media item among the media items;

the hierarchy of vector clusters is a nested hierarchy of mood clusters that group the mood vectors; and the selected subset of the mood clusters represents a tier among multiple tiers of the nested hierarchy, the centroid vectors of the selected mood clusters describing and representing the same artist.

A sixteenth embodiment provides a method according to any of the first through fifteenth embodiments, wherein:

the items described by the descriptive vectors have a common source;

the selected subset of the vector clusters is representative of the common source of the items; and the method further comprises:

storing identifiers of centroid vectors of vector clusters in the selected subset, the identifiers being stored with a contemporary timestamp in an evolutionary history of items attributed to the common source.

A seventeenth embodiment provides a method according to any of the first to sixteenth embodiments, wherein:

the items described by the descriptive vectors are sourced from multiple sources that include a first source and a second source;

the selected subset of the vector clusters has a first portion that is representative of the first source of the items and has a second portion that is representative of the second source of the items; and the method further comprises:

determining that the first source represented by the first portion of the selected subset is distinct from the second source; and causing presentation of a notification that the first and second sources are different.

An eighteenth embodiment provides a machine-readable medium (e.g., a non-transitory machine-readable storage medium) comprising instructions that, when executed by one or more processors of a machine, cause the machine to perform operations comprising:

accessing descriptive vectors that describe items, each descriptive vector having multiple dimensions whose values indicate extents to which multiple characteristics are present in a different item among the items;

calculating vector distances between pairs of the descriptive vectors;

generating a hierarchy of vector clusters by clustering the descriptive vectors into the vector clusters based on the calculated vector distances;

determining centroid vectors of the vector clusters in the hierarchy by calculating mean vectors of the vector clusters, each mean vector and each centroid vector representing a different vector cluster in the hierarchy;

summing inter-cluster vector distances between pairs of the centroid vectors;

summing intra-cluster vector distances between pairs of descriptive vectors in each of the vector clusters;

calculating scores of the hierarchy based on the summed inter-cluster vector distances and on the summed intra-cluster vector distances, each of the scores being calculated based on a different scalar among a plurality of scalars among which a scalar corresponds to an extreme score among the calculated scores; and selecting a subset of the vector clusters in the hierarchy based on the scalar that corresponds to the extreme score.

A nineteenth embodiment provides a machine-readable medium according to the eighteenth embodiment, wherein:

the selecting of the subset of the vector clusters in a hierarchy includes determining that the scalar that corresponds to the extreme score corresponds to a minimum score among the calculated scores; and the selected subset of the mood clusters represents a tier among multiple tiers of the hierarchy.

A twentieth embodiment provides a system (e.g., machine) comprising:

one or more processors; and a memory storing instructions that, when executed by at least one processor among the one or more processors, cause the system to perform operations comprising:

accessing descriptive vectors that describe items, each descriptive vector having multiple dimensions whose values indicate extents to which multiple characteristics are present in a different item among the items;

calculating vector distances between pairs of the descriptive vectors;

generating a hierarchy of vector clusters by clustering the descriptive vectors into the vector clusters based on the calculated vector distances;

determining centroid vectors of the vector clusters in the hierarchy by calculating mean vectors of the vector clusters, each mean vector and each centroid vector representing a different vector cluster in the hierarchy;

summing inter-cluster vector distances between pairs of the centroid vectors;

summing intra-cluster vector distances between pairs of descriptive vectors in each of the vector clusters;

calculating scores of the hierarchy based on the summed inter-cluster vector distances and on the summed intra-cluster vector distances, each of the scores being calculated based on a different scalar among a plurality of scalars among which a scalar corresponds to an extreme score among the calculated scores; and selecting a subset of the vector clusters in the hierarchy based on the scalar that corresponds to the extreme score.

A twenty first embodiment provides a carrier medium carrying machine-readable instructions for controlling a machine to carry out the method of any one of the previously described embodiments.

The invention claimed is:

1. A method comprising:

accessing, by one or more processors, descriptive vectors that describe items, each descriptive vector comprising one or more values indicative of an extent to which one or more characteristics are present in a respective item of the items;

determining, by the one or more processors, one or more vector distances between one or more pairs of the descriptive vectors;

generating, by the one or more processors, a hierarchy of vector clusters by clustering the descriptive vectors into the vector clusters based on the determined one or more vector distances;

determining, by the one or more processors, centroid vectors of the vector clusters in the hierarchy, each centroid vector corresponding to a respective vector cluster in the hierarchy;

summing, by the one or more processors, one or more inter-cluster vector distances between one or more pairs of the centroid vectors;

summing, by the one or more processors, for each of the vector clusters, one or more intra-cluster vector distances between one or more pairs of descriptive vectors;

determining, by the one or more processors, a plurality of scores of the hierarchy by applying a plurality of weightings to the summed inter-cluster vector distances and the summed intra-cluster vector distances, wherein each score of the plurality of scores corresponds to a respective weighting of the plurality of weightings, and wherein a particular weighting of the plurality of weightings corresponds to an extreme score of the plurality of scores; and selecting, by the one or more processors, a subset of the vector clusters in the hierarchy based on the weighting that corresponds to the extreme score.

2. The method of claim 1, further comprising:
accessing the items prior to accessing the descriptive vectors, each of the items including respective media content; and
determining the descriptive vectors by generating a respective descriptive vector for each of the items, wherein generating each respective descriptive vector comprises analyzing the respective media content in a corresponding item to be described.

3. The method of claim 2, wherein:
the accessed items are media items;
the method further comprises normalizing the media items by at least one of:
  omitting duplicate media items, omitting non-original media items, omitting media items released on compilation albums, omitting media items recorded at live performances, or retaining media items recorded in studios; and
determining the descriptive vectors comprises generating a respective descriptive vector for each of the normalized media items.

4. The method of claim 1, wherein:
determining the one or more vector distances between the one or more pairs of the descriptive vectors comprises determining the one or more vector distances between the one or more pairs of the descriptive vectors based on correlations among the descriptive vectors.

5. The method of claim 1, wherein:
determining the one or more vector distances between the one or more pairs of the descriptive vectors comprises calculating one or more quadratic-chi histogram distances between the one or more pairs of the descriptive vectors.

6. The method of claim 1, wherein:
clustering the descriptive vectors comprises clustering the descriptive vectors according to an agglomerative hierarchical clustering algorithm.

7. The method of claim 6, wherein:
the agglomerative hierarchical clustering algorithm includes a complete-linkage clustering algorithm.

8. The method of claim 1, wherein:
determining each score of the plurality of scores comprises:
  selecting a scalar between zero and unity;
  multiplying the scalar by the summed intra-cluster vector distances to obtain a first multiplicative product;
  multiplying the summed inter-cluster vector distances by the scalar subtracted from unity to obtain a second multiplicative product; and
  adding the first multiplicative product to the second multiplicative product to obtain the score.

9. The method of claim 8, wherein:
the items are media items released in a set of albums by a same artist; and
selecting the scalar comprises selecting the scalar based on a count of albums in the set of albums by the same artist.

10. The method of claim 1, further comprising:
modifying the selected subset of the vector clusters in the hierarchy, wherein modifying the selected subset comprises:
  calculating weights of vector clusters in the selected subset, a first calculated weight corresponding to a first vector cluster in the selected subset; and
  removing the first vector cluster from the selected subset based on the first calculated weight failing to exceed a threshold percentile of the calculated weights of the vector clusters in the selected subset.

11. The method of claim 10, wherein:
calculating the weights of the vector clusters in the selected subset comprises calculating the weights of the vector clusters in the selected subset based on sizes of the vector clusters in the selected subset, the first calculated weight being calculated based on a count of descriptive vectors in the first vector cluster within the selected subset.

12. The method of claim 10, wherein:
calculating the weights of the vector clusters in the selected subset comprises calculating the weights of the vector clusters in the selected subset based on average popularity scores of the vector clusters in the selected subset, the first calculated weight being calculated based on an average of a group of popularity scores that correspond to a group of items described by at least some descriptive vectors in the first vector cluster within the selected subset.

13. The method of claim 10, wherein:
calculating the weights of the vector clusters in the selected subset comprises calculating the weights of the vector clusters in the selected subset based on values of most dominant dimensions of the descriptive vectors in the vector clusters in the selected sub set,
  the first vector cluster having a first centroid vector among the centroid vectors,
  the first calculated weight being calculated based on a ratio of a most dominant value of a most dominant dimension in the first centroid vector of the first vector cluster to a sum of less dominant values of less dominant dimensions in the first centroid vector of the first vector cluster.

14. The method of claim 1, further comprising:
generating labels that identify the vector clusters in the selected subset of the hierarchy,
a first label of the generated labels identifying a first vector cluster in the selected subset,
the first vector cluster having a first centroid vector among the centroid vectors,
wherein generating the first label comprises:
determining a set of most dominant dimensions in the first centroid vector of the first vector cluster, the set of most dominant dimensions having most dominant values in the first centroid vector;
accessing a database that maps the set of most dominant dimensions to corresponding textual descriptors; and
incorporating the textual descriptors into the first label.

15. The method of claim 1, wherein:
the descriptive vectors that describe the items are mood vectors that describe media items all recorded by a same artist, each mood vector indicating an extent to which one or more emotions are perceivable in a respective media item of the media items;
the hierarchy of vector clusters is a nested hierarchy of mood clusters that group the mood vectors; and
the selected subset of the mood clusters corresponds to a tier among multiple tiers of the nested hierarchy, the centroid vectors of the selected mood clusters describing and representing the same artist.

16. The method of claim 1, wherein:
the items described by the descriptive vectors have a common source;
the selected subset of the vector clusters is representative of the common source of the items; and
the method further comprises:
storing identifiers of centroid vectors of vector clusters in the selected subset, the identifiers being stored with a contemporary timestamp in an evolutionary history of items attributed to the common source.

17. The method of claim 1, wherein:
the items described by the descriptive vectors are sourced from multiple sources that include a first source and a second source;
the selected subset of the vector clusters has a first portion that is representative of the first source of the items and has a second portion that is representative of the second source of the items; and
the method further comprises:
determining that the first source represented by the first portion of the selected subset is distinct from the second source; and
causing presentation of a notification that the first and second sources are different.

18. A non-transitory machine-readable storage medium comprising instructions that, when executed by one or more processors of a machine, cause the machine to perform operations comprising:
accessing descriptive vectors that describe items, each descriptive vector comprising one or more values indicative of an extent to which one or more characteristics are present in a respective item of the items;
determining one or more vector distances between one or more pairs of the descriptive vectors;
generating a hierarchy of vector clusters by clustering the descriptive vectors into the vector clusters based on the determined one or more vector distances;
determining centroid vectors of the vector clusters in the hierarchy, each centroid vector corresponding to a respective vector cluster in the hierarchy;
summing one or more inter-cluster vector distances between one or more pairs of the centroid vectors;
summing, for each of the vector clusters, one or more intra-cluster vector distances between one or more pairs of descriptive vectors;
determining a plurality of scores of the hierarchy by applying a plurality of weightings to the summed inter-cluster vector distances and the summed intra-cluster vector distances, wherein each score of the plurality of scores corresponds to a respective weighting of the plurality of weightings, and wherein a particular weighting of the plurality of weightings corresponds to an extreme score of the plurality of scores; and
selecting a subset of the vector clusters in the hierarchy based on the weighting that corresponds to the extreme score.

19. The non-transitory machine-readable storage medium of claim 18, wherein:
selecting the subset of the vector clusters in the hierarchy comprises determining that the weighting that corresponds to the extreme score corresponds to a minimum score among the plurality of scores; and
the selected subset of the vector clusters corresponds to a tier among multiple tiers of the hierarchy.

20. A system comprising:
one or more processors; and
a memory storing instructions that, when executed by at least one processor among the one or more processors, cause the system to perform operations comprising:
accessing descriptive vectors that describe items, each descriptive vector comprising one or more values indicative of an extent to which one or more characteristics are present in a respective item of the items;
determining one or more vector distances between one or more pairs of the descriptive vectors;
generating a hierarchy of vector clusters by clustering the descriptive vectors into the vector clusters based on the determined one or more vector distances;
determining centroid vectors of the vector clusters in the hierarchy, each centroid vector corresponding to a respective vector cluster in the hierarchy;
summing one or more inter-cluster vector distances between one or more pairs of the centroid vectors;
summing for each of the vector clusters, one or more intra-cluster vector distances between one or more pairs of descriptive vectors;
determining a plurality of scores of the hierarchy by applying a plurality of weightings to the summed inter-cluster vector distances and the summed intra-cluster vector distances, wherein each score of the plurality of scores corresponds to a respective weighting of the plurality of weightings, and wherein a particular weighting of the plurality of weightings corresponds to an extreme score of the plurality of scores; and
selecting a subset of the vector clusters in the hierarchy based on the weighting that corresponds to the extreme score.

* * * * *